United States Patent [19]
Pegg et al.

[11] 3,768,926
[45] Oct. 30, 1973

[54] PULSE JET ROTOR DRIVE FOR HELICOPTER

[76] Inventors: Robert J. Pegg, 106 Sherwood Rd., Williamsburg, Va. 23185; Clement J. Makowski, 33 Tidewater Dr., Hampton, Va. 23366

[22] Filed: Nov. 30, 1971

[21] Appl. No.: 203,377

[52] U.S. Cl. ................ 416/21, 60/39.34, 60/39.77, 60/249, 416/171
[51] Int. Cl. ............................................ F02k 7/02
[58] Field of Search ...................... 60/39.34, 39.76, 60/39.77, 247, 249, 224; 416/21, 22, 171

[56] References Cited
UNITED STATES PATENTS

| | | | |
|---|---|---|---|
| 2,805,545 | 9/1957 | Wilman | 60/39.34 |
| 2,631,676 | 3/1953 | Hiller | 60/39.77 |
| 2,709,891 | 6/1955 | Dunbar et al. | 60/39.77 |
| 3,462,955 | 8/1969 | Lockwood et al. | 60/39.76 |
| 2,919,542 | 1/1960 | Servanty et al. | 60/249 |
| 2,812,635 | 11/1957 | LeFall et al. | 60/39.77 |
| 2,972,862 | 2/1961 | Servanty | 60/39.34 |
| 3,328,956 | 7/1967 | Seewald et al. | 60/39.77 |
| 3,606,867 | 9/1971 | Briffa | 60/39.76 |

FOREIGN PATENTS OR APPLICATIONS

| | | | |
|---|---|---|---|
| 921,846 | 3/1963 | Great Britain | 60/247 |
| 739,729 | 11/1955 | Great Britain | 60/39.77 |
| 1,286,517 | 1/1962 | France | 60/247 |

*Primary Examiner*—Carlton R. Croyle
*Assistant Examiner*—Warren Olsen
*Attorney*—John W. Malley et al.

[57] ABSTRACT

A pulse-jet system for driving rotary wing aircraft. In a first embodiment the tips of the rotors of a rotary wing aircraft are provided with "U"-shaped valveless pulse jet engines having an annular scoop adjacent to the lip of the inlet to provide fresh air thereto at increased air velocity. In a second embodiment a pair of straight, valveless pulse jet engines are mounted perpendicular to the rotor shaft of a rotary wing aircraft so as to rotate therewith. These engines may be contained within a streamlined cowl at the opposite outer ends of which are attached flow augmenters which change the direction and increase the flow of exhaust gases from the engines by 90° and eject the same in a chordwise direction. This forms a propulsion unit. When a cowl is used, air enters the cowl through an inlet disposed along the axis of the rotor shaft. The propulsion unit is adjusted angularly and heightwise with respect to the rotor blades in order to optimize the aerodynamic effects of the flow of exhaust gases over the blades. In both of the embodiments, a first control device primarily governs the engine thrust and consequently the rotor speed while a second control device can be added which supplies fuel to the engines at a frequency differing from the fundamental or resonant frequency of the engines so that engine noise is reduced. Also, in both embodiments, the engines are started by exciting them with bursts of air from a compressed air supply to be carried on the aircraft.

9 Claims, 6 Drawing Figures

Patented Oct. 30, 1973
3,768,926
2 Sheets-Sheet 1
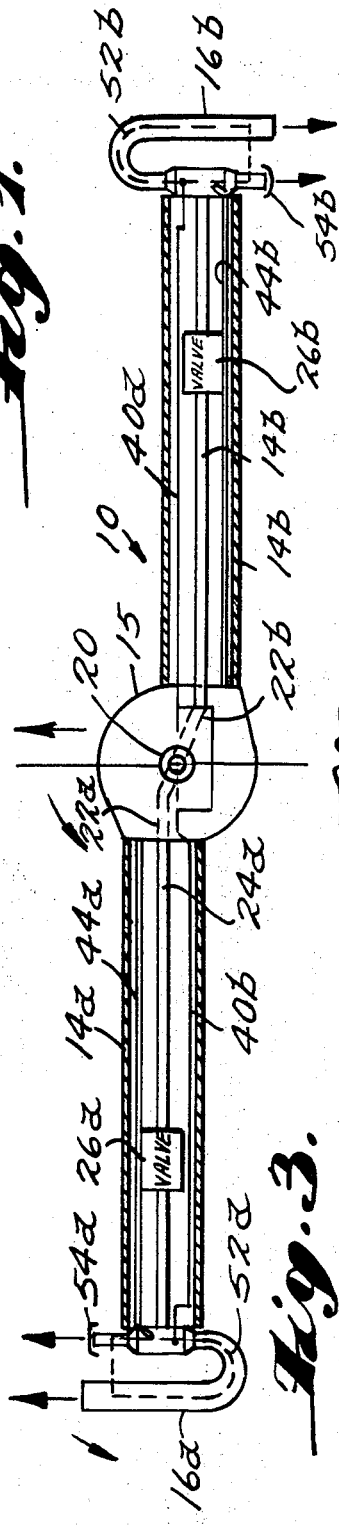
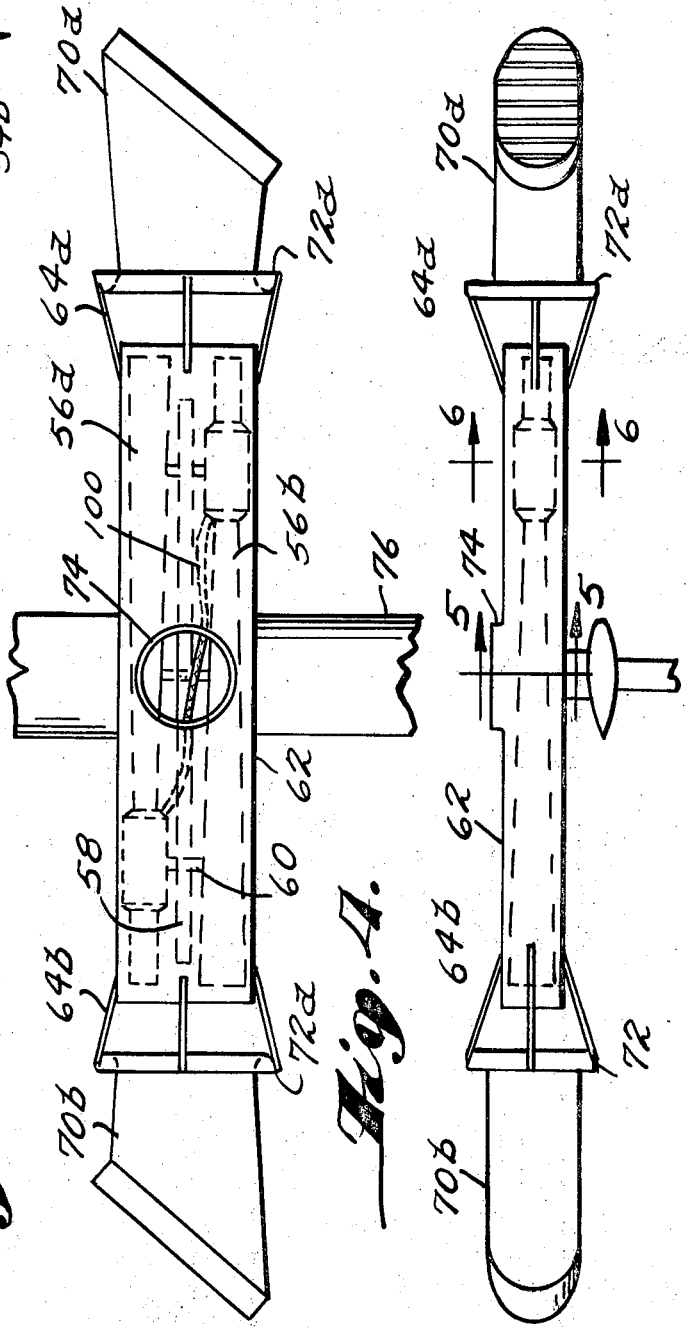
INVENTORS
ROBERT J. PEGG
CLEMENT J. MAKOWSKI
BY Cushman, Darby & Cushman
ATTORNEYS

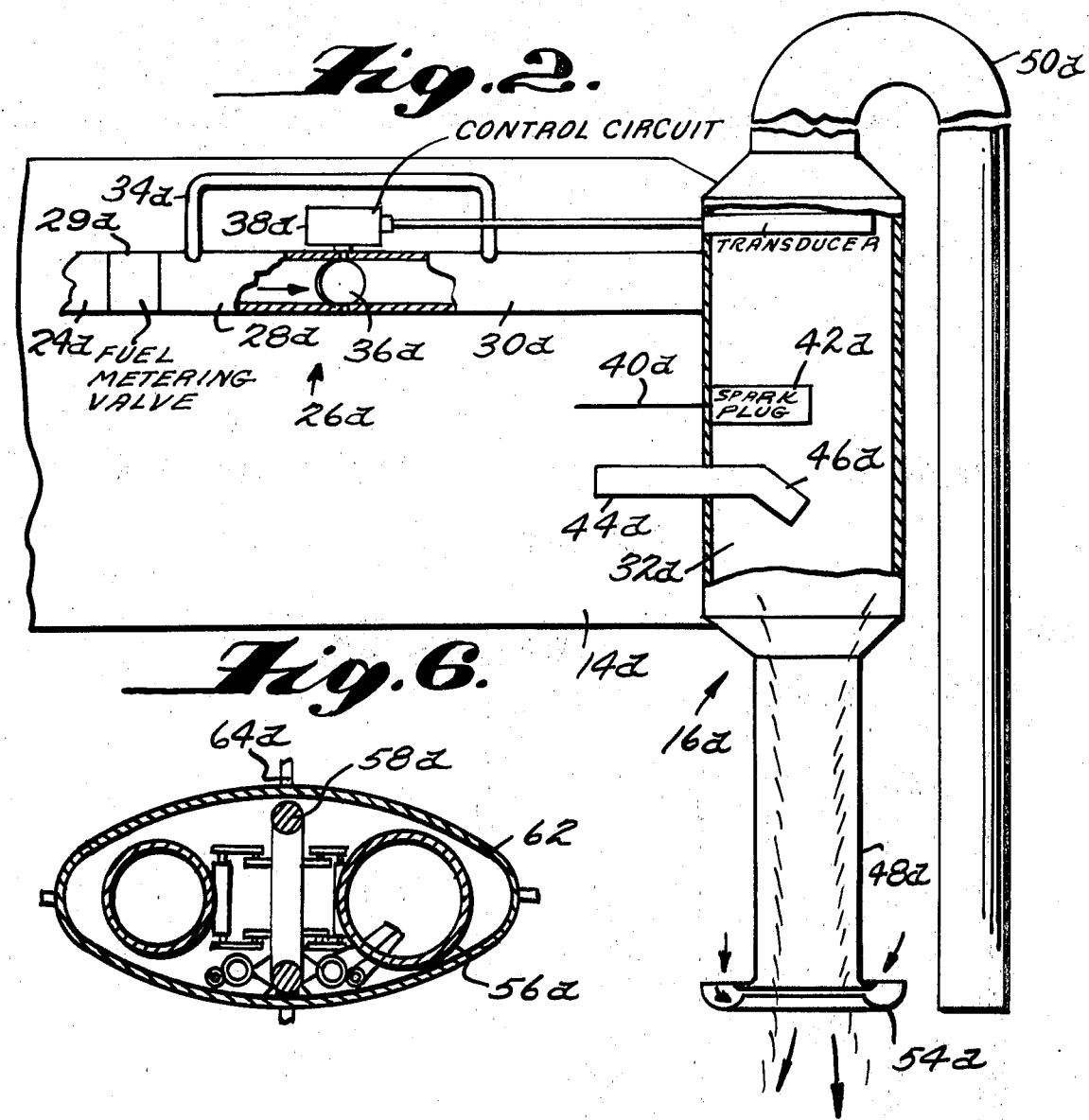
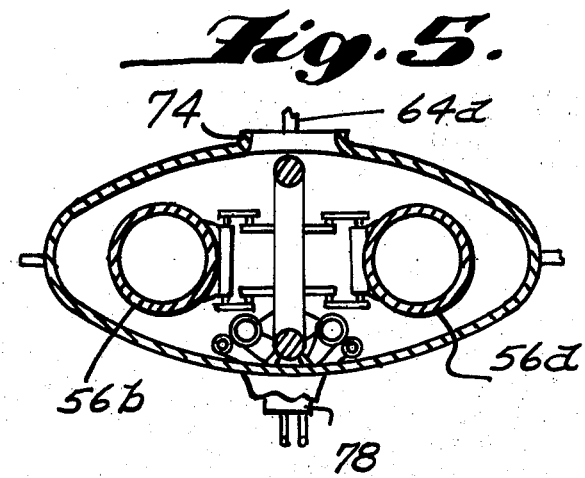

PULSE JET ROTOR DRIVE FOR HELICOPTER

BACKGROUND OF THE INVENTION

1. Field of the Invention

This invention relates to thermo-propulsive tubes with periodic functioning, i.e., pulse-jet engines used to propel rotary wing aircraft. It is to be understood, however, that the pulse jet engines of this invention provide shaft power and thus can be used to power other equipment than rotary wing aircraft.

2. Description of the Prior Art

Previous methods developed for rotary wing propulsion such as subsonic ram jets, valved pulse jets and pressure or turbine jets all have disadvantages which limit their usefulness for low cost, cheaply operated helicopters. The ram jet, for example, has an unacceptable high specific fuel consumption of about eight, and needs an auxiliary starting mechanism. The turbine jets especially, require highly stressed, rapidly moving components such as turbine blades while the conventional valved pulse jets primarily depend on inlet air through a front intake which results in a reduced thermodynamic efficiency, high power-off drag and low life inlet valves. Finally, all of the above types except the turbine jets have poor, low speed operating characteristics and high levels of noise and vibration.

The helicopter propulsion system disclosed in the patent to Servanty, U.S. Pat. No. 3,008,293, issued Nov. 14, 1961 overcomes some of the above problems. For example, it has a specific fuel consumption in the range of 2 or 3 but, as a pulse jet system it is particularly apt to produce a high noise level. Further, since the Servanty design uses but a single engine it cannot have practical multi-engine reliability and finally, the large hub which forms the combustion chamber of the pulse jet engine of the Servanty design adds significantly to the aerodynamic drag of the aircraft.

SUMMARY OF THE INVENTION

In order to overcome the disadvantages of the prior art discussed above it is one object of the applicants' invention to provide multi-engine pulse jet propulsion for a rotary wing aircraft which has a relatively low noise level. In addition, it is an object of the applicants' invention to provide a rotary wing aircraft with pulse jet engines which produce a minimum of aerodynamic drag and which present a significant intake area to the direction of flight despite the orientation of the engine.

In a first embodiment, applicants' invention comprises "U"-shaped valveless pulse jet engines affixed to the ends of the blades of a rotary wing aircraft such that the open ends of the "U"-shaped engines are directed towards the trailing edges of the blades. Air is supplied to these engines by suction following the explosions. An annular scoop is arranged around the lip of the inlet of the pulse jet for receiving secondary or extra air when the inlet is in an environment which restricts normal air aspiration (high rotational speeds), and the inlet is opposite the direction of flight, i.e., in the absence of ram air.

The pulse jet engines of this first embodiment are started by bursts of air which are forced therethrough from a compressed air tank carried on the aircraft. The noise level of the pulse jet engines can be lowered by supplying fuel thereto at a random frequency sufficient to cause sustained operation without duplicating a resonant or fundamental frequency of engines.

In a second embodiment, two or more straight pulse jet engines are mounted to the rotor shaft of the aircraft so as to rotate therewith but in a plane perpendicular to said shaft. These engines can be covered with a streamlined cowl and each engine exhausts through a flow augmenter which changes the output of flow from a radial to a tangential direction. When a cowl is used, air enters the cowl through an opening within the top of the cowl which is co-axial with the shaft and flows over the engines cooling them until it enters the inlet ends thereof.

Noise abatement by random frequency fuel injection is also utilized in the second embodiment. In addition, noise is abated in the second embodiment by out-of-phase operation of engines disposed in parallel with respect to one another. Also, the construction of the augmenters and the extra air introduced thereby help to depress the noise level as well as increase the propulsion unit efficiency.

BRIEF DESCRIPTION OF THE DRAWINGS

The preferred embodiments of the invention will now be described with reference to the drawings in which:

FIG. 1 is a partially schematic top view of the rotary wing for a helicopter in accord with the first embodiment of the invention;

FIG. 2 is a detailed view of one "U"-shaped pulse jet shown in FIG. 1;

FIGS. 3 and 4 are plan and elevation views of a second embodiment of the invention;

FIG. 5 is a sectional view taken along lines 5—5 in FIG. 4, and

FIG. 6 is a sectional view taken along lines 6—6 of FIG. 4.

The same elements are indicated by the same reference numerals throughout the drawings.

DETAILED DESCRIPTION OF THE PREFERRED EMBODIMENTS

Turning to FIG. 1, the reference numeral 10 refers generally to a rotary wing assembly for a helicopter 12 (not shown). The particular wing assembly generally includes a pair of identical blades 14a and 14b and a pair of identical "U"-shaped pulse jets 16a and 16b mounted on the tips of blades 14a and 14b, respectively. The wing assembly is connected to the body of helicopter 12 by the hub 15 which contains a fuel inlet 20, a pair of fuel outlets 22a and 22b, and a rotary seal for connecting the inlet 20 to the outlets 22a and 22b while the hub 15 rotates with respect to the stationary helicopter body. The fuel inlet 20 is conventionally connected to a fuel reservoir (not shown) which is carried on the helicopter body while the fuel outlets 22a and 22b connect, respectively, with fuel lines 24a and 24b disposed, respectively, within blades 14a and 14b.

The fuel lines 14a and 14b contain control valves 26a and 26b, respectively, which compensate for the centrifugal forces acting upon the fuel within the lines when said hub and blades are rotating to insure a steadily increasing flow of fuel to the engines 16a and 16b, respectively, which correspond to increasing blade rotation. The valves 26a and 26b also serve to inject fuel into the engines 16a and 16b, respectively, at a predetermined but irregular frequency which varies the combustion frequency of the pulse jet engines 16a and 16b from their resonant or fundamental frequencies which are, of course, determined basically by the length of said pulse jet engines. Varying the operating frequency of a pulse jet engines can reduce its noise output in the range of 10 percent and also results in lower fuel consumption since only enough fuel is injected in the engines by valves 26a and 26b to produce bursts or pulses of power. In the prior art fuel was continuously introduced and thus some fuel was lost during the exhaust portion of the pulse jet operation.

As can be seen from FIG. 2, which shows only one of the identical valves 26, namely, valve 26a, this valve comprises a fuel inlet 28a which communicates through fuel metering valve 29a with fuel line 24a, a fuel outlet which commjnicates with the combustion chamber 32a of engine 16a and a feed back resonance channel 34a connecting outlet 30a with inlet 28a. The heart of the valve 26a is a fast acting control throttle 36a disposed between the fuel inlet and restrictor 29a and outlet 30a which is opened or closed by a signal from control circuit 38a. In turn, the control circuit 38a responds to a signal developed by the pressure transducer 39a which is located within the combustion chamber 32a. Since the fuel in line 24a is subjected to great centrifugal pressures at higher rotational speeds of the rotor assembly, the restrictor 29a is provided in line 24a upstream of fuel inlet 28. The restrictor 29a partially compensates for the centrifugal pressure so that the fuel is smoothly delivered to inlet 28, i.e., the increase in centrifugal pressure caused by the increasing rotational speed of blade 14a does not cause the fuel column in line 24a to be separated from the rest of the fuel system because restrictor 29a acts as a counter balancing force to the centrifugal force acting on the fuel. The construction of restrictor 29a is known per se to the rotary wing art and thus need not be discussed here in great detail. Of course, a valve 29b, identical to valve 29a in construction and operation is located on blade 14b as are equivalent elements to the others described above.

The blades 14a and 14b also receive ignition lines 40a and 40b which pass current from a source of electrical energy located in the helicopter body to sparking devices 42a and 42b located in engines 16a and 16b, respectively. Similarly, the blades 14a and 14b receive air lines 44a and 44b, respectively, which are connected at their inner ends through rotary seals to a source of compressed air located in the helicopter body and are connected at their outer ends to nozzles 46a and 46b, respectively, which are located within the combustion chambers 32a and 32b, respectively.

Basically, as seen in FIG. 2, engine 16a comprises a combustion chamber 32a, an inlet section 48a and and outlet section 50a the major length of which is disposed in parallel to the combustion chamber 32a and is connected thereto by a "u" shaped end portion. For convenience, the inlet is defined as that entrance to the combustion chamber which supplies fresh air for combustion and the exhaust is defined as that inlet to the combustion chamber in which air drawn in during the intake sequence provides a precompression before combustion. The entire engine is preferably covered by the cowl 52a, shown in dotted lines in FIG. 1, which is aerodynamically designed to reduce drag and possibly produce another source of lift for the helicopter.

The operation of engine 16a is as follows: During start up compressed air is introduced to combustion chamber 32a through nozzle 46a in bursts. Simultaneously, with the introduction of compressed air, sparking occurs at sparking device 42a and a fuel pump is energized within the body of the craft which causes fuel to be introduced through inlet 24a, control valve 26a and outlet 30 at a steadily increasing pressure and flow to combustion chamber 32a. This combination of air, fuel and spark causes a pulsing combustion within the engine without the need for additional starting means and, as the blades 14a and 14b rotate about hub 20 more fuel is delivered which continually increases the thrust produced by engine 16a and thus accelerates the blades to operational speed. Once the pulse jets have been started, the compressed air and ignition 42a are deactivated since ignition will continue due to the hot gases within combustion chamber 32a. A combustion chamber pressure actuator can be used to automatically initiate starting sequence if flame out occurs.

At operational speed the ambient air is rammed into the inlet section 48a when the engine 16a is in the position shown by the arrows in FIG. 1 vis-a-vis the direction of helicopter travel, and the engine is in the intake state of its pulsed operation. In addition, an annular air scoop 54a is concentrically disposed around the inlet 48a and the exhaust of the engine 16a so that fresh air may enter the combustion chamber 32a even when the engine 16a is in the position of engine 16b, shown in FIG. 1, vis-a-vis the direction of helicopter travel. Such a scoop substantially increases the high speed capabilities of the engine since it allows for forced air injection at high speed during the intake sequence.

The control circuit 38 may be deactivated during start-up so that, at operational speed, pulses will occur at resonant frequency within chamber 32a since fuel will be drawn into this chamber through open valve 38a purely in response to the periodic low pressure conditions within chamber 32a. At operational speed, however, the control circuit 38 is energized by a signal from the helicopter and this circuit controls the throttle 36a to oscillate the fuel delivered to combustion chamber at a random rate which varies the frequency of combustion within chamber 32a from the resonant frequency of engine 16a to lower the noise level of engine 16a by a factor of about 10 percent. This frequency variation may be accomplished by setting the control circuit 38 to respond to a pressure other than the exhaust pressure in chamber 32a. Thus, fuel is introduced into chamber 32a at a time other than the time at which it would normally be drawn therein by a partial low pressure vacuum in chamber 32a.

Turning to FIGS. 3 through 6, the second embodiment of the applicants' invention will now be described. In this embodiment, the control devices and the compressed air starting system described above will be also utilized. In this embodiment, however, the valveless pulse jet engines 56a and 56b are straight rather than "u" shaped and these engines are mounted symmetrically and perpendicularly to the axis of the rotor shaft of the helicopter. The fuel lines, compressed air line and ignition lines are also attached to the frame 58 through rotary connections as in the first embodiment. Engines 56a and 56b are suspended on a frame 58 which is fixedly connected to the hub 20', and are mounted for axial movement with respect to the frame through hinge pins 60. Furthermore, both the engines, fuel, ignition and compressed air lines and the frame can be enclosed by a streamlined cowl 62 which reduces the air resistance of the assembly.

The outer ends of cowl 62 are fixedly connected by spiders 64a and 64b, respectively, to the augmenters 70a and 70b, respectively. These augmenters change the direction of flow of the gases exhausted by the engines into a rotation perpendicular to the axis of rotation. In addition, the lips 72a and 72b associated, respectively, with the inner ends of the augmenters channel additional air therethrough which increases the total mass flow of gases and consequently, the thrust of the propulsion unit. Also, the presence of an aspirated jacket of secondary air being drawn into the augmenters changes the radial gradients in the velocity of sound which tends to decrease the noise produced by the engines. In addition, the augmenters are preferably made of slit metal or other permeable material which absorbs high frequency noise when the cowl is used.

Air is supplied to the engines 56a and 56b by a large air inlet 74 located on the top of cowl 62 coaxially with respect to the rotor shaft. This positioning of the air inlet causes ambient air which is drawn into the cowl to pass over the hot engines and cooling them before being inducted into the inlets of engines 56a and 56b.

As shown in FIGS. 3 and 4 the cowl is positioned at 90° with respect to the blades 76 of the helicopter but those skilled in the art should realize that the propulsion unit may be variously positioned with respect to the blades in order to optimize the effect of the exhaust flow over the blades. It is noted that a conducting passage 100 between the combustion chambers of the valveless pulse jet engines permits the engines to operate out of phase. In other words, the engines are operated out of synchronism to reduce the cumulative effects of their radiated acoustic vibration and, in fact, to cause the vibrations of one engine to partially offset the vibrations of the other.

Those skilled in the art will also realize that other changes are possible within the scope of the applicants' invention, i.e., more than two engines may be included within the cowl and the shape of the augmenters may be varied.

What is claimed is:

1. A rotary wing aircraft propulsion system comprising:
   a hub,
   at least one set of rotary blades mounted for rotation about an axis of said hub,
   at least a pair of identical valveless pulse jet engines, each mounted perpendicularly to said axis and extending in proximity and roughly parallel to each other and each including a combustion chamber, an inlet passage to said combustion chamber for allowing air to pass thereto, means for supplying fuel and an igniting spark to said combustion chamber for causing periodic combustion within said chamber and an outlet passage from said chamber extending in axial alignment with the inlet passage to that chamber and in proximity to said inlet passage of the other pulse jet engine of said pair for allowing combustion gases to pass therefrom, and
   means for mounting said engines symetrically about said axis.

2. The rotary wing aircraft propulsion system of claim 1 further including a source of compressed air and means for introducing said compressed air to said combustion chamber in periodic bursts to encourage the starting of periodic combustion within said combustion chamber and to cause said blades to rotate.

3. The rotary wing aircraft propulsion system of claim 1 wherein said means for supplying fuel to said combustion chamber comprises a fuel supply line and a valve means controlling the flow of fuel through said supply line which introduces periodic bursts of fuel into said chamber at a frequency differing from the fundamental frequency of said valveless pulse jet engines.

4. The rotary wing aircraft propulsion system of claim 3 wherein said valve means comprises a pressure transducer located within said combustion chamber for producing a signal in response to the pressure therein, a valve located on said fuel line for controlling the flow of fuel through said fuel supply line and control means electrically connected to said pressure transducer and operatively connected to said valve for controlling said valve in response to signals from said pressure transducer.

5. The rotary wing aircraft propulsion system of claim 1 wherein said valveless pulse jet engines are circumferentially surrounded by a streamlined cowl.

6. The rotary wing aircraft propulsion system of claim 1 wherein said mounting means includes means for permitting limited movement in their axial directions.

7. The rotary wing aircraft propulsion system of claim 1 wherein said means for supplying fuel, igniting sparks and connecting passage to said engines so that the engines are operated out-of-phase with one another whereby their composite radiated acoustic vibration level is reduced.

8. The rotary wing aircraft propulsion system of claim 1 further including ducts communicating with the outlets of said engines for changing the direction of combustion gases exiting therefrom to a direction tangential to said rotary blades.

9. The rotary wing aircraft propulsion system of claim 8 wherein said ducts include means for entrapping secondary air with said combustion gases to thereby increase the thrust of said engines.

* * * * *